(12) United States Patent
McDuff et al.

(10) Patent No.: US 8,206,534 B2
(45) Date of Patent: Jun. 26, 2012

(54) LAMINATED PANEL AND PROCESS

(75) Inventors: Rodrigue McDuff, Longueuil (CA); Stephen Murphy, Westmount (CA); Luc Vachon, Westmount (CA); Philippe Koyess, Montréal (CA)

(73) Assignees: Armfoam Inc., Longueuil (CA); Sport Maska Inc., Montreal (CA)

( * ) Notice: Subject to any disclaimer, the term of this patent is extended or adjusted under 35 U.S.C. 154(b) by 0 days.

(21) Appl. No.: 12/974,161

(22) Filed: Dec. 21, 2010

(65) Prior Publication Data

US 2011/0086205 A1   Apr. 14, 2011

Related U.S. Application Data

(62) Division of application No. 11/572,109, filed as application No. PCT/CA2005/001096 on Jul. 14, 2005, now Pat. No. 7,879,423.

(60) Provisional application No. 60/605,138, filed on Aug. 30, 2004, provisional application No. 60/587,516, filed on Jul. 14, 2004.

(51) Int. Cl.
*B32B 37/04* (2006.01)
*B32B 38/06* (2006.01)

(52) U.S. Cl. ............ 156/219; 156/309.6; 156/245; 156/290; 156/323; 264/271.1

(58) Field of Classification Search ............... 156/219, 156/308.2, 308.4, 309.6, 581, 245, 290, 209, 156/213, 222, 323; 264/271.1, 273, 284

See application file for complete search history.

(56) References Cited

U.S. PATENT DOCUMENTS

| | | | |
|---|---|---|---|
| 3,007,205 A | 11/1961 | House | |
| 3,406,234 A * | 10/1968 | Bailly | 264/257 |
| 3,969,811 A | 7/1976 | Zahn | |
| 4,340,558 A | 7/1982 | Hendrickson | |
| 4,538,787 A * | 9/1985 | Fox et al. | 249/112 |
| 4,810,558 A | 3/1989 | Hornung et al. | |
| 4,917,903 A | 4/1990 | Mente | |
| 5,053,179 A | 10/1991 | Masui et al. | |
| 5,514,458 A | 5/1996 | Schulze-Kadelbach et al. | |
| 5,783,133 A | 7/1998 | Hara et al. | |
| 6,865,823 B1 * | 3/2005 | Vindriis | 36/29 |
| 2004/0043683 A1 | 3/2004 | Muench | |
| 2005/0090167 A1 | 4/2005 | Hynicka et al. | |

FOREIGN PATENT DOCUMENTS

| | | |
|---|---|---|
| GB | 1345150 | 1/1974 |
| JP | 54-148845 | 11/1979 |
| RU | 2 193 972 | 12/2002 |
| WO | 98/03333 | 1/1998 |
| WO | 03/002339 | 1/2003 |
| WO | 2004065117 | 8/2004 |

* cited by examiner

*Primary Examiner* — Katarzyna Wyrozebski Lee
*Assistant Examiner* — Scott W Dodds
(74) *Attorney, Agent, or Firm* — Norton Rose Canada LLP

(57) ABSTRACT

A laminated panel (23) comprises a fusible layer (23A) having an upper surface. A mesh layer (23A, A1) has an encapsulated portion enclosed in the fusible layer so as to be below the upper surface of the fusible layer (23A). An embossed portion (A1) protrudes from the upper surface of the fusible layer (23A). A method (10) of forming a laminated panel with the fusible layer and the mesh layer comprises the steps of: i) heating the fusible layer (23A) to fuse a portion of the fusible layer; and ii) pressing only selected portion of the mesh layer against the fusible layer to provide for the formation of an embossed pattern (A1) on the resulting laminated panel (10).

18 Claims, 3 Drawing Sheets

LAMINATED PANEL AND PROCESS

CROSS-REFERENCE TO RELATED APPLICATIONS

The present patent application is a divisional of U.S. patent application Ser. No. 11/572,109, filed Jan. 15, 2007, now U.S. Pat. No. 7,879,423 which is U.S. National Phase Entry of PCT/CA2005/001096, bearing an International Filing Date of Jul. 14, 2005, both incorporated herein by reference. The present application claims priority on U.S. Provisional Patent Application No. 60/587,516, filed on Jul. 14, 2004, and on U.S. Provisional Patent Application No. 60/605,138, filed on Aug. 30, 2004, both incorporated herein by reference.

TECHNICAL FIELD

The present invention generally relates to a lamination process and, more particularly but not exclusively, to a process for laminating various layers into a laminated panel, for subsequent use of the laminated panel as a component of a boot quarter, for sporting goods or the like.

BACKGROUND ART

Laminated panels are found in a plurality of products. Laminated panels typically consist of a plurality of layers, each layer being part of the laminated panels for given properties. Therefore, laminated panels are used as an alternative to well known materials, such as leather and polymers (e.g., vinyl), in the fabrication of goods.

The layers constituting laminated panels are chosen for various properties that will suit the subsequent use of the product. For instance, layers having properties such as resilience, impermeability, strength, shock absorption, softness, are combined to be laminated into panels that will have selected characteristics.

The lamination processes typically involve a continuous feed of the layers into presses, and therefore involve expensive equipment. Moreover, effects such as embossing are desired on some panels, and this involves further equipment, for instance to synchronize embossing dies with the feed of material in the lamination process.

It would thus be desirable to simplify the lamination process and to lessen the cost of equipment involved in the process, for instance when embossing is required in the laminated panels.

SUMMARY OF INVENTION

Therefore, it is a feature of the present invention to provide a novel method for laminating panels.

It is a still further feature of the present invention to provide a novel laminated panel.

Therefore, in accordance with the present invention, there is provided a method of forming a laminated panel with at least a fusible layer and a mesh layer, comprising heating the fusible layer to fuse a portion of the fusible layer, and pressing only a selected portion of the mesh layer against the fusible layer to provide for the formation of an embossed pattern of mesh layer projecting above the adjacent fusible layer in which mesh layer is encapsulated, in the resulting laminated panel.

Further in accordance with the present invention, there is provided a method of forming a laminated panel, comprising assembling product layers including a fusible polymeric layer, a mesh layer, and a core layer, heating the fusible polymeric layer to fuse a portion of the fusible polymeric layer, and pressing only a selected portion of the mesh layer against the fusible polymeric layer to provide for the formation of an embossed pattern of mesh layer projecting above the adjacent fusible polymeric layer in which mesh layer is encapsulated, in the resulting laminated panel.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
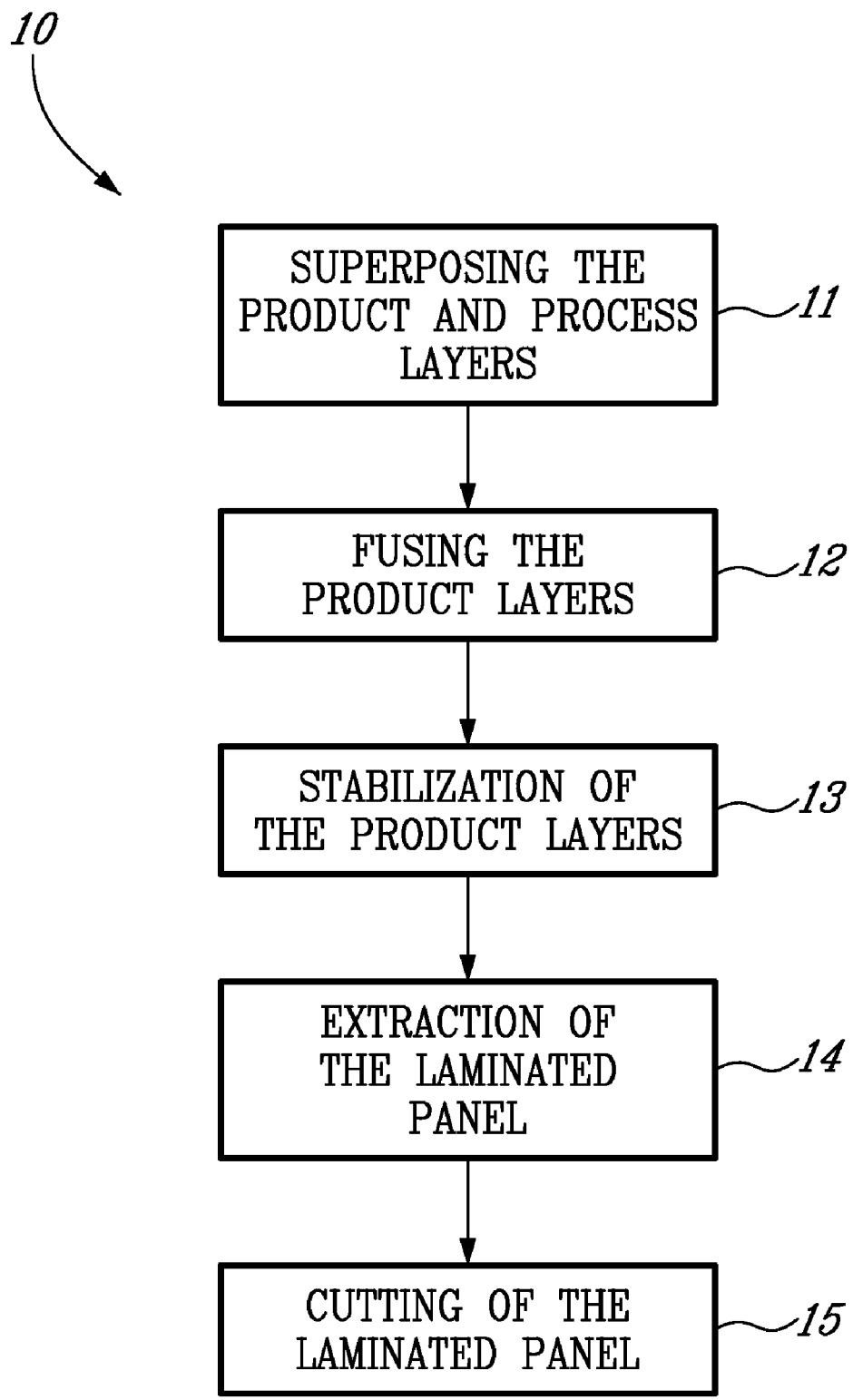
FIG. 1 is a flow chart illustrating a lamination process in accordance with a preferred embodiment of the present invention.

Referring to the drawings and, more particularly, to FIG. 1, a lamination process in accordance with a preferred embodiment is generally shown at 10. The process 10 is used to fuse layers of material (hereinafter product layers) to form a laminated panel, using process layers to facilitate the process and obtain effects, such as embossing, in the laminated panel.

Assembly of Product and Process Layers for the Process 10

Figure 2:
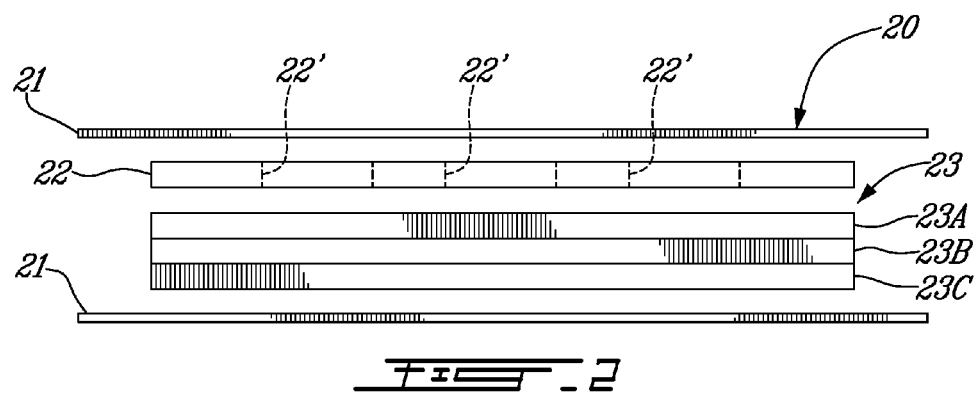
FIG. 2 is a schematic side view of an assembly of materials prior to being subjected to the process of FIG. 1.

Referring to FIG. 2, a typical assembly of the product and process layers that will be used as a batch in the process 10 is generally shown at 20. The assembly 20 has a pair of antiadhesive sheets 21 between which a remainder of the layers are sandwiched. The antiadhesive sheets 21 are typically fiberglass sheets with both surfaces having an anti-adhesive coating, such as a PTFE coating (i.e., polytetrafluorethylene). The antiadhesive sheets 21 are process layers, in that they will not be part of the laminated panel.

Figure 4:
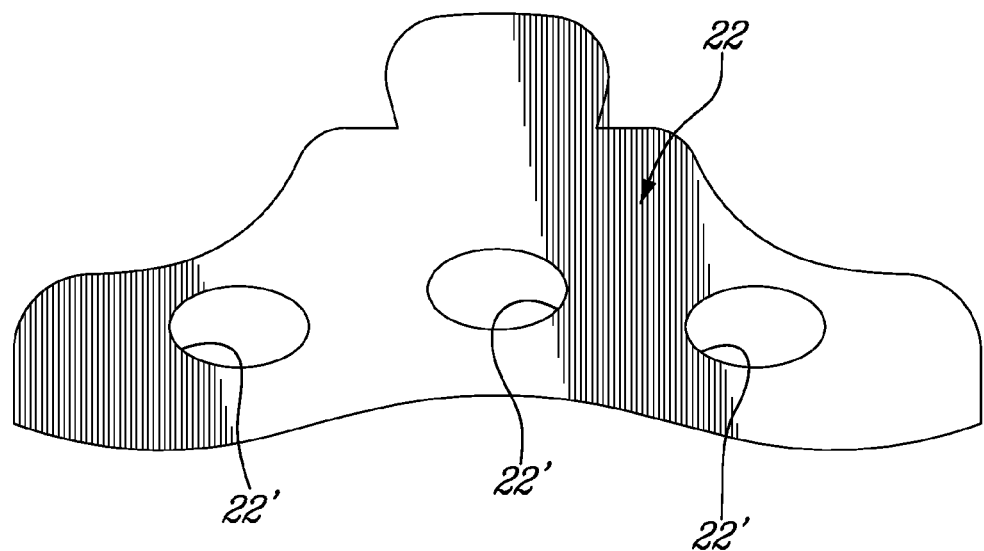
FIG. 4 is a top plan view of an embossing die of a process layer of the assembly of materials.

As shown in FIGS. 2 and 4, an embossing die 22 is adjacent to one of the antiadhesive sheets 21. The embossing die 22 may be a flat panel made of a material having a relatively high thermal conductivity. Shapes 22' are defined in the panel and these shapes will outline the embossing in the laminated panel that will be produced by the process 10, as will be described hereinafter. Although a single layer of the embossing die 22 is shown in FIG. 1, it is contemplated to provide another embossing die 22 adjacent to the other antiadhesive sheet 21 so as to create embossing on both surfaces of the laminated panel that will be produced by the process 10. In such a case, guiding templates are typically used to ensure that the embossing dies 22 are aligned with respect to one another.

For instance, the embossing die 22 typically consists of aluminum (aluminum plate between $\frac{1}{16}$" and $\frac{1}{2}$" thickness, as a function of the desired embossing), in which shapes have been defined using laser or abrasive jet cutting techniques. Other materials, such as metals and high thermal conductivity materials, can also be used to constitute the embossing die 22. A coating may be applied on the embossing die 22, to reduce adherence of the product layers 23 to the embossing die 22. The embossing die 22 is also part of the process layers, as it will not be part of the laminated panel.

As shown in FIG. 2, product layers 23 are positioned between one of the antiadhesive sheets 21 and the embossing die 22. The product layers 23 will be fused so as to become the laminated panel, with process layers (i.e., the antiadhesive sheets 21 and the embossing die 22) being removed following the embossing process 10 (FIG. 1).

The Process 10

Figure 3A:
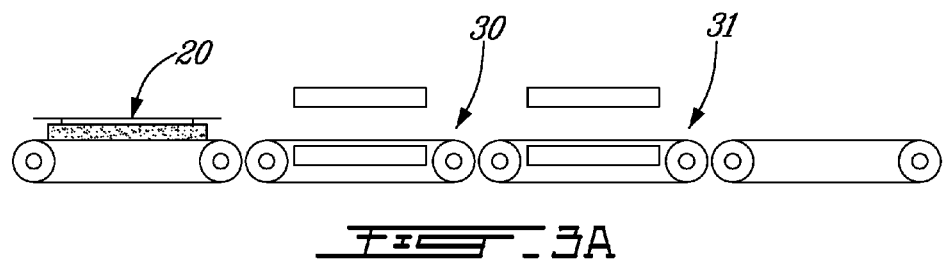
FIGS. 3A, 3B and 3C represent a sequence of steps of the process of FIG. 1.

Referring concurrently to FIGS. 1 and 3A, the process 10 has a first Step 11 of superposing the product and process layers into the assembly 20 (FIG. 3A), as described previously.

Figure 3B:
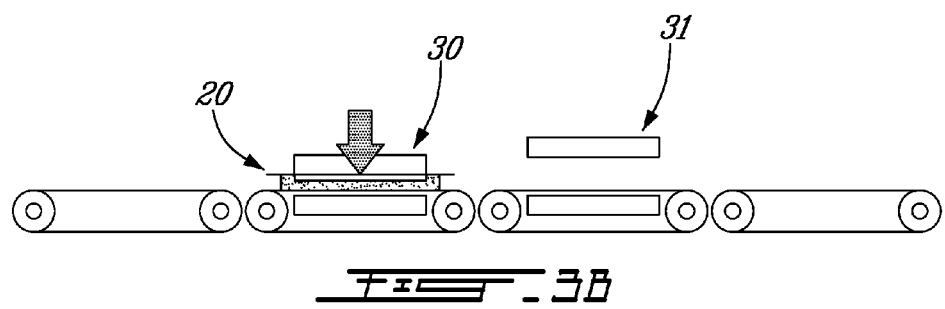

In Step 12, the product layers 23 are laminated. Step 12 involves positioning the product and process layers in a press 30. The press 30 is then closed on the assembly 20, as shown in FIG. 3B, to apply pressure and heat on the assembly 20, so as to create a fusing reaction between the various components of the product layers 23.

The temperature, pressure and cycle time settings of the press 30 are selected as a function of the product layers 23 that will be fused into the laminated panel. As will be discussed below, press settings will be described with examples of product layers 23. Once the cycle is over, the assembly 20 is removed from the press 30.

Figure 5:
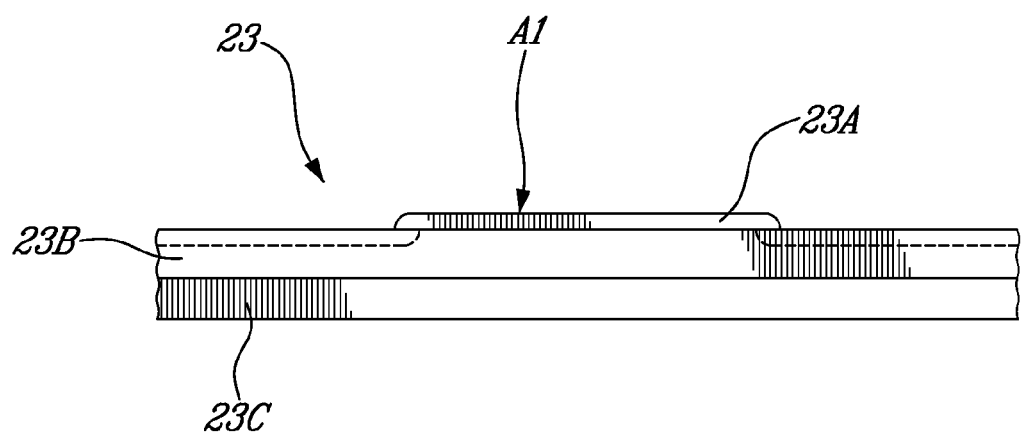
FIG. 5 is a side elevation view of the assembly of materials of FIG. 2, after having been subjected to the process of FIG. 1.

The embossing die 22 will cause some embossing in the product layers 23, in that the pressure applied to the product layers 23 will be lower where the shapes are defined in the embossing die 22. This will cause the product layer 23 to be thicker at the locations, resulting in some embossing in the product layer 23. This is illustrated in FIG. 5, in which embossed portions A1 of the layer 23 are defined as a result of the process 10.

Figure 3C:
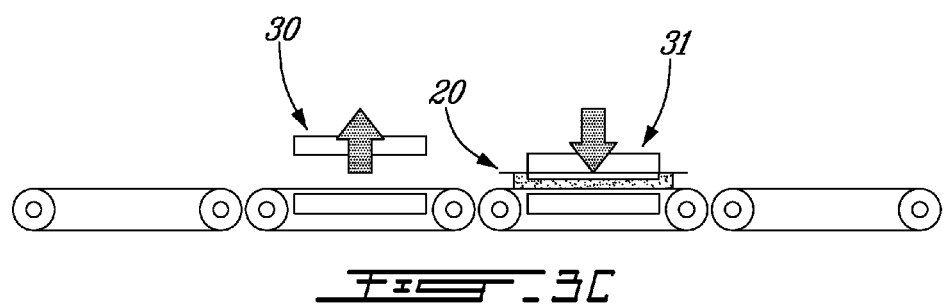

Referring concurrently to FIGS. 1 and 3C, in Step 13, the assembly 20 may undergo a stabilization step in a press 31, in which a pressure is applied onto the assembly 20, and in which the assembly 20 is cooled to ambient temperatures.

The stabilization step is performed to enable the product layers 23 of the assembly 20 to stabilize into their new fused conditions. As the product layers 23 include various types of materials, such as expanded polymer resins and bonding agents, the product layers 23 may be unstable at the exit of the press 30 in Step 12. Therefore, Step 13 is provided to enable the product layers 23 of the assembly 20 to stabilize into shape as a whole, according to the desired aspect of the laminated product.

Once more, the temperature, pressure and cycle time settings of the press 31 are selected as a function of the product layers 23 of the assembly 20.

The product layer 23 and the process layers assembly 20 may stay together between Steps 12 and 13. Therefore, the assembly 20 may be carried as a whole from the press 30 to the press 31. The use of antiadhesive sheets 21 to conceal a remainder of the assembly 20 facilitates the removal of the assembly from the hot press 30, and its handling toward the cooling press 31 (e.g., using the sheets 21 which overhang the product layers 23 for grip). Moreover, the antiadhesive sheets 21 generally prevent product layer residues to gather on the plates of the presses 30 and 31, which residues would impede on the efficiency of the presses. It is pointed out that the material and coating of the sheets should be selected so as not to affect the thermal conductivity of the assembly 20. The presence of the embossing die 22 throughout Steps 12 and 13 helps in producing well defined embossing in the laminated panel.

It is also contemplated to provide a single press, equipped with both a heating system and a cooling system, such that the Steps 12 and 13 take place one after the other in the same press, such that the assembly 20 stays assembled as in Step 11. This satisfies the process in that no alignment is required for the assembly 20 to be cooled after being heated, as is the case if the assembly 20 switches presses (e.g., FIGS. 3B and 3C).

In Step 14, the laminated panel is extracted from the assembly 20. More specifically, the process layers, namely the antiadhesive sheets 21 and the embossing die 22 are separated from the product layers 23. The fused product layers 23 define the laminated panel of the preferred embodiment. The process layers are then reusable for subsequent cycles of the process 10.

In Step 15, the laminated panel is cut in pieces, according to intended use of the laminated panel. For instance, boot quarters may be cut following the outline created by the embossing. Moreover, items such as eyelets, trademark logos and decorative materials may be added to the pieces of laminated panel.

It is contemplated to provide curved press surfaces and embossing die 22, so as to shape the product layers 23 with curvature.

It is pointed out that conveyors may be provided, as shown in FIGS. 3A to 3C, whereby the displacement of the assembly 20 in the process 10 may be automated.

The Product Layers 23

The product layers 23 may include various materials, according to the type of panel that is desired. As shown in FIG. 2, the product layers 23 include an external layer 23A, core layers 23B and an internal layer 23C.

The external layer 23A will constitute one of the exposed layers of the laminated panel. Accordingly, the material constituting the external layer 23A will be chosen as a function of the intended use of the laminated panel. For instance, the external layer 23A may consist of fabrics, such as polyester and/or nylon fabrics.

Alternatively, the external layer 23A may be a combination of layers. For instance, to enhance the embossing of the laminated panel, a combination of a mesh layer and a fusible polymeric layer [e.g., polypropylene or polyethylene base material or coating, such as a thermo-plastic olefin (TPO), Surlyn™ 8940, with a thickness of 0.040"] is typically used with the process 10. In such a case, the mesh layer (e.g., nylon monofilament meshing, with color coating) will be enclosed in the fusible polymeric layer in areas without embossing, while being exposed at embossing portions. In addition to creating a visual effect, the mesh embossing will reinforce the laminated panel. On the other hand, the laminated panel remains relatively flexible, whereby it may be shaped/conformed into various products. One type of mesh layer that may be used in the process 10 is a 355D nylon 6 monofilament (diameter of 0.008"), with 800D nylon mono-ply.

The core layers 23B typically include reinforcement materials having a temperature reactive bonding agent, used to reinforce the fabrics and to bond the external layer 23A to other layers of the core layers 23B. The reinforcement materials typically consist of synthetic fiber base materials, such as a non-woven fabric made from a blend of synthetic fibers and impregnated with a filled styrene copolymer with EVA hot melt adhesive. The bonding agent is preferably activated at a given temperature, such as an EVA glue (ethylene-vinyl-acetate).

A core material of the core layers 23B is typically present, and is fused to the external layers 23A by the reinforcement materials. The core material may be an expanded polymer, such as expanded polypropylene (EPP), expanded polyethylene (EPE), expanded polystyrene (EPS), or similar polymeric foams. The density and thickness of such foams varies according to the type of laminated panel desired. Other types of core material include papers, cardboard, fabrics, wood and the like. As an example, some laminated panels have a core of EPP having a density ranging between 2.5 and 5.5 lb/in$^3$, with a thickness ranging between 0.188" and 0.280", for given applications. It is contemplated to use cores of other densities and/or thickness in accordance with the contemplated application of the laminated panel.

Another layer of reinforcement material may then be provided in the core layers 23B, to further reinforce the laminated panel. It is pointed out that the reinforcement material may consist in predefined shapes that will cause an embossing effect in a surface of the laminated panel.

The internal layer 23C will constitute an exposed surface of the laminated panel. For instance, when the laminated panel is used as a boot quarter, this surface will constitute an interior of the boot. Accordingly, it is contemplated to use a fabric, such as a polyester, as the internal layer 23C. A suitable type of polyester that may be used as the internal layer 23C is a 100% brushed polyester (e.g., 1.96 oz/yd$^2$).

It is pointed out that similar materials, and additional layers, may be added to define various configurations of the laminated panel. For the above described materials, suitable fusing results have been obtained heating the press 30 (FIG. 3C) to about 170° C. (e.g., 172° C.) with a 4 Psi pressure applied to the assembly 20, for a cycle of 120 seconds in the press 30, to compress a 0.40" of product layers 23 to below 0.37".

The stabilization of Step 13 subsequently took place for another cycle of 120 seconds at pressure of 4 Psi in the cooling press 31, to compress the 0.37" of product layers 23 into the laminated panel of 0.25" of thickness. The temperature of the plates of the press 31 were initially below 16° C., and generally maintained thereat throughout stabilization in Step 13.

As mentioned previously, the temperature, pressure and cycle time settings are dependent on the materials being used, the thickness of the product layers 23, and their capacity to keep their laminated shape following the process 10, and the thickness of the process layers (e.g., embossing die 22). The above values are given for illustrative purposes. For instance, although the cycle time for the Steps 12 and 13 is the same in the above examples, these cycle time values are independent from one another, and it may be that the stabilization cycle is longer to ensure the embossing keeps its shape.

Referring to FIGS. 2 and 4, the thickness of the embossing die 22, in relation to the other factors of the lamination process 10, may have an effect on the surface texture of the laminated panel. More specifically, a greater thickness of the embossing die 22 (e.g., ¼" and more), will result in thicker air pockets between the press plates and the product layers 23. opposite the shapes 22'. As air acts has a thermal insulator, heat from the press 31 is transferred to a portion of the layer 23A that is in contact with the material of the embossing die 22, whereas the shapes 21' encapsulate air such that the portion of layer 23A opposite the shapes 21' is subjected to lower temperatures and can thus react differently.

Therefore, the thickness of the embossing die 22' is factored in when specific surface texture is required, such as the embossing using a mesh that will be partially encapsulated in a fusible polymeric material. Mesh will show opposite the shapes 21', whereas a lustered polymeric material will encapsulate the mesh opposite the material of the embossing die 22.

Amongst the various possible uses of the laminated panels are the sporting goods industry (quarters for sport shoes/boots, boot quarters for skate boots, padding for various sports, such as shoulder pads, chest protectors, back pads, rib pads, thigh pads, helmet components, playing surfaces), the clothing industry (boot quarters, e.g., military boots), the furniture industry (cushions, seat backrests, wall partitions), the packing industry and the automotive industry (door inner shell, arm rests, decorative components).

It is within the ambit of the present invention to cover any obvious modifications of the embodiments described herein, provided such modifications fall within the scope of the appended claims.

The invention claimed is:

1. A method of forming a laminated panel with at least a fusible layer and a mesh layer, comprising:
    i) heating the fusible layer to fuse a portion of the fusible layer; and
    ii) pressing only a selected portion of the mesh layer against the fusible layer to provide for the formation of an embossed pattern of mesh layer projecting above the adjacent fusible layer in which mesh layer is encapsulated, in the resulting laminated panel.

2. The method according to claim 1, wherein said pressing only a selected portion comprises pressing the mesh layer surrounding a periphery of the embossed pattern.

3. The method according to claim 1, further comprising securing a third layer to another surface of the fusible layer.

4. The method according to claim 3, comprising providing the third layer in at least one of a polymer, an expanded polymeric foam, and fabric.

5. The method according to claim 3, comprising providing the third layer in an expanded polymeric foam.

6. The method according to claim 1, comprising providing the fusible layer in any one of olefin, ionomeric resin, polypropylene, polyethylene, or thermoplastic olefin.

7. The method according to claim 1, comprising providing the fusible layer in an ionomeric resin.

8. The method according to claim 1, further comprising cooling the fused portion of the fusible layer while maintaining a pressure on the laminated panel after ii).

9. The method according to claim 1, further comprising cutting the resulting laminated panel with respect to the embossed pattern, so as to define at least one boot quarter panel.

10. The method according to claim 9, further comprising shaping the boot quarter panel into at least one boot quarter.

11. The method according to claim 1, wherein i) and ii) are performed concurrently by pressing a die with cut-outs on the assembly of the mesh layer and the fusible layer, with heat being transferred from the die through the mesh layer to the fusible layer, and with the cut-outs defining the embossed pattern.

12. The method according to claim 11, further comprising sandwiching the die, the fusible layer and the mesh layer between sheets of anti-adhesive material prior to said heating.

13. The method according to claim 1, wherein said pressing comprises forming a logo with the embossed portion, a periphery of the logo being the mesh layer projecting above the adjacent fusible layer.

14. A method of forming a laminated panel, comprising:
    i) assembling product layers including a fusible polymeric layer, a mesh layer, and a core layer;
    ii) heating the fusible polymeric layer to fuse a portion of the fusible polymeric layer; and
    iii) pressing only a selected portion of the mesh layer against the fusible polymeric layer to provide for the formation of an embossed pattern of mesh layer projecting above the adjacent fusible polymeric layer in which mesh layer is encapsulated, in the resulting laminated panel.

15. The method according to claim 14, comprising providing the core layer in at least one of a polymer, an expanded polymeric foam, or fabric.

16. The method according to claim 14, comprising providing the core layer in an expanded polymeric foam.

17. The method according to claim 14, comprising providing the fusible polymeric layer in any one of olefin, ionomeric resin, polypropylene, polyethylene or thermoplastic olefin.

18. The method according to claim 14, comprising providing the fusible layer in an ionomeric resin.

* * * * *